Oct. 23, 1951  G. B. ELLIS  2,572,017
DRY BATTERY CELL
Filed July 3, 1950
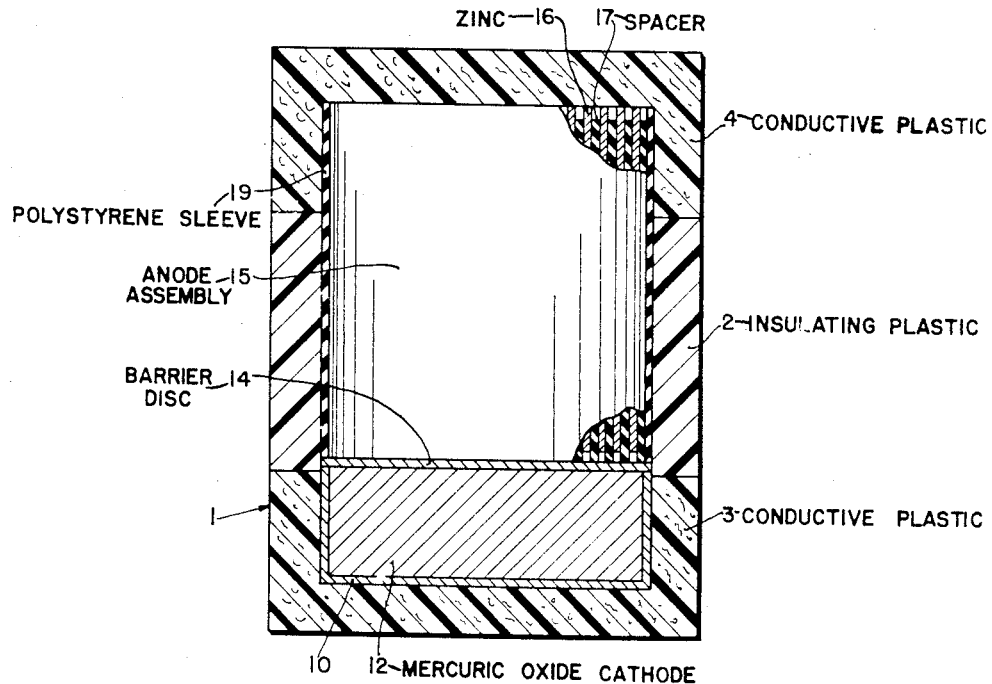
*INVENTOR.*
GRENVILLE B. ELLIS
BY
Harry M. Saragovitz
*Attorney*

UNITED STATES PATENT OFFICE 2,572,017

DRY BATTERY CELL

Grenville B. Ellis, Red Bank, N. J., assignor to the United States of America as represented by the Secretary of the Army Application July 3, 1950, Serial No. 171,999

1 Claim. (Cl. 136—107)

(Granted under the act of March 3, 1883, as amended April 30, 1928; 370 O. G. 757)

The invention described herein may be manufactured and used by or for the Government for governmental purposes, without the payment of any royalty thereon.

This invention relates to an hermetically sealed primary dry cell having a cell container made of plastic material.

Many difficulties have been encountered in providing electrical circuit terminals for the electrodes within the cell through the non-conductive plastic material of the cell container, particularly because of the danger of leakage or creepage of electrolyte along the interface between the metal of the terminal and the plastic material of the cell container.

It is a general object of the present invention to eliminate the use of metallic terminals altogether by using electrically conductive plastic material in those zones of the cell container where an electrical contact through the plastic wall is desired.

Other and more detailed objects of the invention are to effect simplicity of structure and efficiency of large scale manufacture so as to provide an economic and reliable primary cell of prolonged shelf life.

Additional objects will become apparent from the following description of preferred embodiments of the invention in its application to alkaline dry cells and to cells of the Leclanche type.

The drawing shows a vertical sectional view of an alkaline dry cell (the anode being partly in elevation), which comprises a cylindrical container 1 which consists of three parts; namely, a central tubular member 2 made of insulating plastic material and two end cups 3 and 4 made of electrically conductive plastic material. The end cups 3 and 4 are secured by a suitable adhesive to the two ends of the central tubular member 2 so as to form an hermetically sealed housing for the internal elements of the primary alkaline dry cell. These internal elements comprise in known manner an anode assembly 15 conventionally consisting of a roll of amalgamated zinc foil 16 interwound with a strip of porous electrolyte retaining sheet spacing material 17. The upper edge of the zinc foil projects at the top and the lower edge of the porous sheet material projects at the bottom of the rolled assembly 15. The anode assembly 15 is surrounded by an insulating sleeve 19 consisting of polystyrene or other suitable insulating materials.

An ionically permeable barrier disc 14 separates the anode assembly 15 from the cathode 12 consisting in known manner of an electronically conductive mass of oxygen yielding compounds such as an oxide of silver or mercury or other suitable depolarizing materials. These depolarizing materials are usually mixed with carbon or graphite to increase their electrical conductivity. The depolarizing material is preferably contained in a cylindrical steel cup 10.

No separate terminals are necessary for the dry cell illustrated in the drawing since the upper edge of the anodic zinc foil 16 is in direct electrical contact with the end cup 4 while the cathodic steel cup 10 stays in direct electrical contact with the end cup 3; the two end cups 3 and 4 therefore constitute the terminals of the dry cell.

The insulating plastic material as used for the tubular member 2 may consist of polystyrene, ethyl cellulose, nylon, polyethylene, methylmethacrylate or any other suitable high polymer which is inert to the chemical and electrochemical reactions of the cell. The conductive plastic material used for the end cups 3 and 4 may consist of any one of the plastic materials mentioned before which have been made conductive by the admixture of powdered graphite, conductive metal compounds or metallic powder. The metal to be used must be such as not to set up local action with the electrolyte or to form electric couples which would interfere with the function of the cell. It may thus be necessary to use different metals for different parts of the container, depending on their position relative to the internal elements of the cell. In the cell illustrated in the drawing, for instance, the plastic material of the end cup 3, which makes contact with the cathode of the cell, may be loaded with graphite, nickel or iron while the plastic material used for the end cup 4, which is in contact with the zinc foil of the anode, may preferably be loaded with copper, tin or silver.

The amount of conductive material to be mixed with the plastic material depends on the nature of both the conductive and the plastic material. Generally, it may be stated that adequate results can be obtained by mixing between 40 and 60 percent graphite powder or between 70 to 80 percent metallic powder into any of the above-mentioned plastic materials.

While there has been described what, at present, is considered preferred embodiments of the inventive idea it will be understood by those skilled in the art that various changes, modifications and adaptations may be made therein without departing from the invention and it is

I claim:

In an hermetically sealed primary alkaline dry cell of the zinc-mercuric oxide type, an airtight assembly including a cell container of plastic dielectric material, a zinc-anode structure, a depolarizing cathode, a barrier between anode and cathode, and an immobilized body of an aqueous alkaline metal hydroxide electrolyte, said cell container consisting of a central tubular portion of non-conductive plastic material, an anodic end section of plastic material made electrically conductive by the admixture of zinc powder and a cathodic end section of plastic material made electrically conductive by the admixture of graphite powder.

GRENVILLE B. ELLIS.

REFERENCES CITED

The following references are of record in the file of this patent:

UNITED STATES PATENTS

| Number | Name | Date |
|---|---|---|
| 1,837,361 | Ford | Dec. 22, 1931 |
| 2,536,696 | Ruben | Jan. 2, 1951 |

FOREIGN PATENTS

| Number | Country | Date |
|---|---|---|
| 1,273 | Great Britain | Jan. 11, 1884 |